J. F. BYERS.
Oatmeal Machine.
No. 210,667.  Patented Dec. 10, 1878.
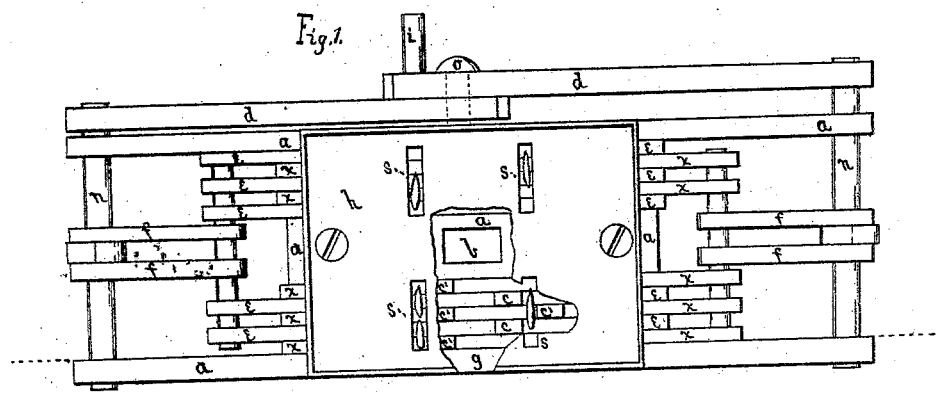
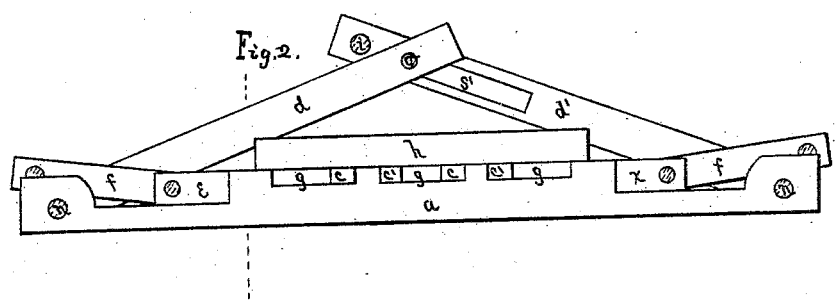
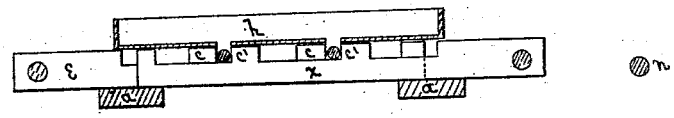
Witnesses —
O. P. Sperra
Geo. F. Robinson
Inventor
John F. Byers,
by Bradford Howland
his Attorney

UNITED STATES PATENT OFFICE.

JOHN F. BYERS, OF RAVENNA, OHIO, ASSIGNOR OF ONE-HALF HIS RIGHT TO CHARLES C. BYERS, OF MEADVILLE, PENNSYLVANIA.

IMPROVEMENT IN OATMEAL-MACHINES.

Specification forming part of Letters Patent No. 210,667, dated December 10, 1878; application filed September 18, 1878.

*To all whom it may concern:*

Be it known that I, JOHN F. BYERS, of Ravenna, Portage county, Ohio, have invented a new and useful Improvement in Oatmeal-Machines, of which the following is a specification:

My invention relates to that class of oatmeal-machines in which the oats are cut transversely into particles of the desired size.

The object of my invention is to cut the oats by depositing them on a series of thin metallic bars having their sides in contact with each other, and provided with short upward-projecting teeth or knives, which cut the oats between them by the alternate bars having opposite longitudinal reciprocating motions.

In the drawings, Figure 1 is a top view of the machine. Fig. 2 is a side elevation. Fig. 3 is a longitudinal section at the dotted line in Fig. 1. Fig. 4 is a cross-section at the dotted line in Fig. 2.

The thin metallic bars $e$ $e$ $e$ and $x$ $x$ are placed alternately side by side in frame $a$, in contact with each other, so that the grain cannot pass down between them. The knives $c$ $c'$ are short projections on the tops of the bars, having cutting-edges, and having depressions in the top of the bar, between and on each side of the knives, for the meal to pass out laterally through like depressions $g$ $g$ on each side of frame $a$, and also through opening $b$ in the frame between the two series of bars.

The bars $e$ and $x$ have reciprocating motions given to them through pitmen $f$ $f$, shafts $n$ $n$, and arms $d$ $d'$ by alternately raising and lowering the arms by means of pin $i$.

Arms $d$ $d'$ are connected by pin $o$, which slides in slot $s'$.

The relative motions of bars $e$ and bars $x$ are in opposite directions.

The hopper $h$, attached to the top of frame $a$, has slots $s$ in its bottom across bars $e$ and $x$, and wide enough to permit the oats to drop through them lengthwise across bars $e$ and $x$, between knives $c$ and $c'$.

Fig. 1 represents a part of hopper $h$, broken away to show the relative positions of knives $c$ $c'$ and slots $s$ when arms $d$ $d'$ are raised. By lowering the arms the knives $c$ $c'$ are moved toward each other, cutting the oats between them.

The thickness of bars $e$ and $x$ determines the requisite fineness of the meal.

The oats which may fall endwise through slots $s$ will be cut between the upper edges of the knives and the sides of the slots.

I claim as my invention—

In an oatmeal-machine, the alternate parallel bars $e$ and $x$, with their sides in continuous contact, and provided on their upper edges with knives $c$ $c'$, and depressions across the top of the bars for the escape of the meal, substantially as described.

JOHN F. BYERS.

Witnesses:
BRADFORD HOWLAND,
JOHN H. DUSSEL.